(12) United States Patent
D'Amico et al.

(10) Patent No.: US 6,636,799 B2
(45) Date of Patent: Oct. 21, 2003

(54) METHOD AND APPARATUS FOR MODIFICATION OF VEHICULAR NAVIGATION INFORMATION

(75) Inventors: Thomas V. D'Amico, Palatine, IL (US); Walter L. Davis, Arlington, WA (US); Thomas J. Mactavish, Inverness, IL (US); Shrirang N. Jambhekar, Palatine, IL (US); Jurgen Reinold, Palatine, IL (US); Don Remboski, Dearborn, MI (US); David Wheatley, N. Barrington, IL (US); William F. Zancho, Hawthorn Woods, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/036,867

(22) Filed: Dec. 21, 2001

(65) Prior Publication Data

US 2003/0120420 A1 Jun. 26, 2003

(51) Int. Cl.$^7$ .............................................. G01C 21/00
(52) U.S. Cl. ...................... 701/200; 701/207; 701/208; 701/213; 340/988; 340/990; 340/995

(58) Field of Search .................................. 701/200, 207, 701/208, 212, 213, 214; 340/988, 990, 995

(56) References Cited

U.S. PATENT DOCUMENTS

| | | | | |
|---|---|---|---|---|
| 5,187,810 A | * | 2/1993 | Yoneyama et al. | 455/509 |
| 6,047,234 A | * | 4/2000 | Cherveny et al. | 701/200 |
| 6,292,743 B1 | * | 9/2001 | Pu et al. | 701/202 |
| 6,453,233 B1 | * | 9/2002 | Kato | 701/208 |

* cited by examiner

Primary Examiner—Marthe Y. Marc-Coleman
(74) Attorney, Agent, or Firm—Fitch, Even, Tabin & Flannery

(57) ABSTRACT

Substantive informational conflicts as between navigation information provided by an in-vehicle navigation unit (101) and an in-vehicle roadside information service receiver (107) are detected (203). When detected, information from one source or the other is modified (207). Such modification can include alteration and/or deletion of one information item or the other. The modification can alleviate the conflict and/or otherwise provide alternative information to a user of the vehicle to support journey goals.

36 Claims, 3 Drawing Sheets

METHOD AND APPARATUS FOR MODIFICATION OF VEHICULAR NAVIGATION INFORMATION

TECHNICAL FIELD

This invention relates generally to in-vehicle navigation systems and more particularly to vehicles as are also equipped with roadside information radio reception services.

BACKGROUND OF THE INVENTION

In-vehicle navigation systems are known in the art. Such systems often function to present an in-transit set of instructions to guide a driver of a vehicle to a previously identified journey goal. Such systems often use the global positioning system and/or other in-vehicle location determining mechanisms (such as automatic dead-reckoning sensors and tools) to ascertain a present location of the vehicle. This information is utilized in combination with previously stored map information to identify a viable path by which the vehicle can reach the identified destination. Driving instructions are provided to the driver in a variety of ways, including by graphic display of a map, display of textual instructions (sometimes in combination with instructional symbology such as directional arrows), and/or audio cues.

Wireless communications are also known in the art. Wireless systems making use of frequency reuse, such as cellular systems, are virtually ubiquitous and dispatch services are also well integrated and dispersed. Both are key components of modern infrastructure.

Now, at least one group seeks to define a new wireless communications service to specifically facilitate terrestrial-based vehicular journeys (particularly for automobiles and trucks). Presently known as dedicated short range communications (DSRC), the Federal Communications Commission in the United States has presently at least tentatively identified spectrum that can be used for such journey-related information. The American Society for Testing and Materials presently acts as a standards development group to define such a communications service to support provision of journey-related information to vehicular users. At present, the over-the-air interface has not been defined (though at least two wireless local area network systems—the I.E.E.E.#802.11a and Motorola's control channel based Freespace system—are enabling, have been proposed, and are being considered). This group has, however, made considerable progress towards defining the services that the service will support. In particular, such a journey-related information provision system should ultimately provide roadside information and corresponding vehicle-to-vehicle communications to support both public safety and private requirements (depending upon the application, transmission range will likely vary from fifteen meters to three hundred meters).

As an example of public safety services, such a roadside information system can be expected to support:

Traffic count (for example, determining the number of vehicles that traverse an intersection over a given period of time);
Traffic movement information;
Toll collection;
In-vehicle signage (for example, presenting "stop" information within the cockpit of a vehicle as the vehicle approaches a stop sign);
Road condition warnings;
Intersection collision avoidance (including highway/rail intersections);
Vehicle-to-vehicle information (for example, stopped vehicle or slowing vehicle information);
Rollover warnings;
Low bridge warnings;
Border clearance facilitation;
On-board safety data transfer;
Driver's daily log;
Vehicle safety inspection information; and
Emergency vehicle traffic signal preemption.

Examples of private requirements include:

Premises access control;
Gasoline payment;
Drive-through retail payment;
Parking lot payments;
Various vehicular related data transfers (for example, diagnostic data, repair service record data, vehicular computer program updates, map information, and user content such as music);
Rental car processing;
Fleet management;
Locomotive fuel monitoring; and
Locomotive data transfer.

When a vehicle has both a navigation system and a roadside information service-based system, a likelihood exists that information provided by these two systems will, from time to time, conflict. Such conflicting information can, at a minimum, distract or confuse a driver. A need therefore exists for a way to at least minimize confusing or misdirecting a driver through provision of conflicting information from such systems.

BRIEF DESCRIPTION OF THE DRAWINGS

This need and others are substantially met through provision of the method and apparatus for modification of vehicular navigation information as disclosed herein. Various other benefits and attributes will become more evident upon making a thorough review and study of the following detailed description, particularly when taken in conjunction with the drawings, wherein.

DETAIL DESCRIPTION OF THE PREFERRED EMBODIMENTS

In general, a terrestrial vehicle (such as an automobile, truck, or the like) has an on-board navigation system that is at least partially based upon previously stored navigation information. This same vehicle is also equipped to receive radio frequency transmissions that are compliant with a roadside information service that provides at least roadside information. In accordance with various embodiments of the invention, information conflicts between navigation information and received information from the roadside information service are detected. In response to detecting such a conflict, modifications are automatically made to the navigation information and/or the roadside information as received from the roadside information service. That modified information is then used to provide information accordingly to a user.

Figure 1:
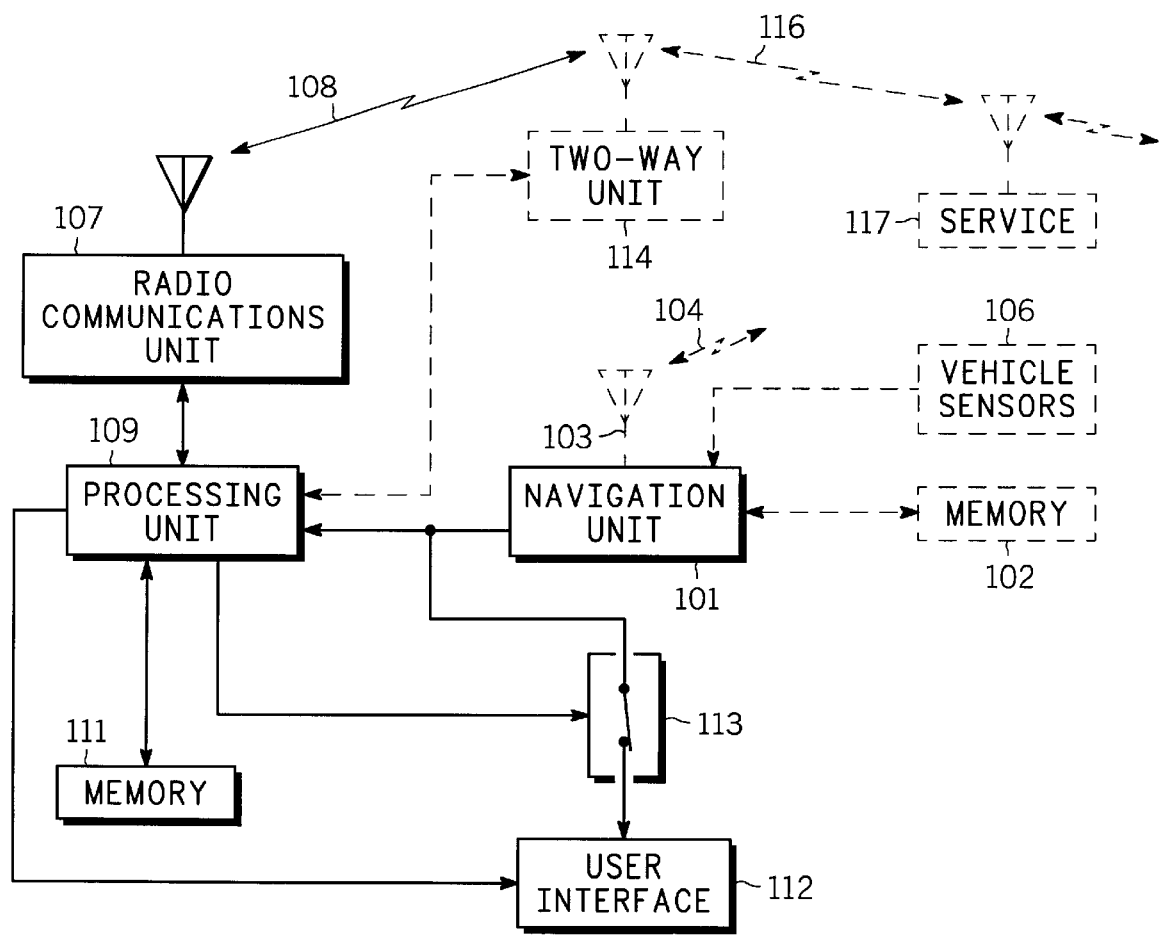
FIG. 1 comprises a block diagram depiction of an apparatus configured in accordance with an embodiment of the invention.

Referring now to FIG. 1, a navigation unit 101 can be provided in a terrestrial vehicle (not shown) to provide navigation information to a user of a vehicle. This information will typically include specific directions regarding particular turns and other journey-related information as appropriate to reach a pre-identified destination. These instructions will ordinarily be at least partially based upon previously stored navigation information and such information can be stored, for example, in an optional memory 102 that couples to the navigation unit 101 in order to make such information available to the navigation unit 101. Depending upon the application, such memory can include disk space or portable memory (including electronic, magnetic, and optical storage mediums) or any combination thereof. Depending upon the application, such memory can include disk space or portable memory (including both electronic, magnetic, and optical storage mediums) or any combination thereof.

In addition, the navigation unit 101 is capable of at least approximating a current location of the vehicle in which the navigation unit 101 is installed. To facilitate this, the navigation unit 101 can be provided with a global positioning system receiver (exemplified in FIG. 1 by depiction of a global positioning system antenna 103) that can receive global positioning system signals 104 and process them properly to thereby determine the location of the vehicle. In the alternative (or in addition), vehicular sensors 106 can optionally be provided to facilitate location determination through dead reckoning techniques.

All of the above generally referred to navigation techniques are well understood in the art. Accordingly, for the sake of brevity, additional elaboration will not be presented here.

A radio communications unit 107 is also installed in the vehicle, which radio communications unit 107 is equipped and configured to receive radio frequency transmissions 108 that are compliant with a roadside information service such as, for example, digital short-range commendations (DSRC) systems as understood in the art. Such systems provide roadside information services regarding various items, including information that can potentially conflict with journey information as otherwise provided by the navigation unit 101.

Informational outputs from both the navigation unit 101 and the radio communication unit 107 are provided to a processing unit 109. The processing unit 109 includes at least sufficient computational capabilities to support the various detection and response capabilities described further below. If desired, the processing unit 109 can be formed integrally with the radio communications unit 107 and/or the navigation unit 101. The processing unit 109 has a corresponding memory 111 coupled thereto to facilitate the activities described below. For example, depending upon the embodiment being enabled as described below, the memory 111 can contain any of one or more journey goals for one or more occupants of the vehicle, an information profile for one or more occupants of the vehicle (which profile can include various items of information including intended destinations for the corresponding user), and the like.

A user interface 112 serves to provide information to one or more users of the vehicle regarding information provided by the navigation unit 101 and the processing unit 109 as corresponds to roadside information received via the radio communications unit 107. (If desired, multiple user interfaces could be provided to support these multiple information sources; for purposes of clarity, however, only one such interface is shown here.) In one embodiment, the navigation unit 101 can provide information directly to the user interface 112 through a switch 113 that is controlled by the processing unit 109. So configured, the processing unit 109 can open the switch 113 to prevent information from being provided directly by the navigation unit 101 to the user interface 112. So configured, information from the navigation unit 101 can then be modified as desired by the processing unit 109 and then provided to the user interface 112. In an alternative embodiment, information from the navigation unit 101 always first passes through the processing unit 109 prior to being provided to the user interface 112 in modified or unmodified form.

With the configuration described above, many of the embodiments described below can be readily enabled. In addition, if desired and as appropriate to other embodiments, an additional two-way communications unit 114 can be provided to exchange communications 116 between the processing unit 109 and a remote service 117. This remote service 117 can provide various kinds of information and services as appropriate to the embodiment being enabled, including additional navigation information and additional processing capability to detect conflicts between navigation unit information and roadside service information as obtained through the radio communications unit 107, again as described in more detail below.

Figure 2:
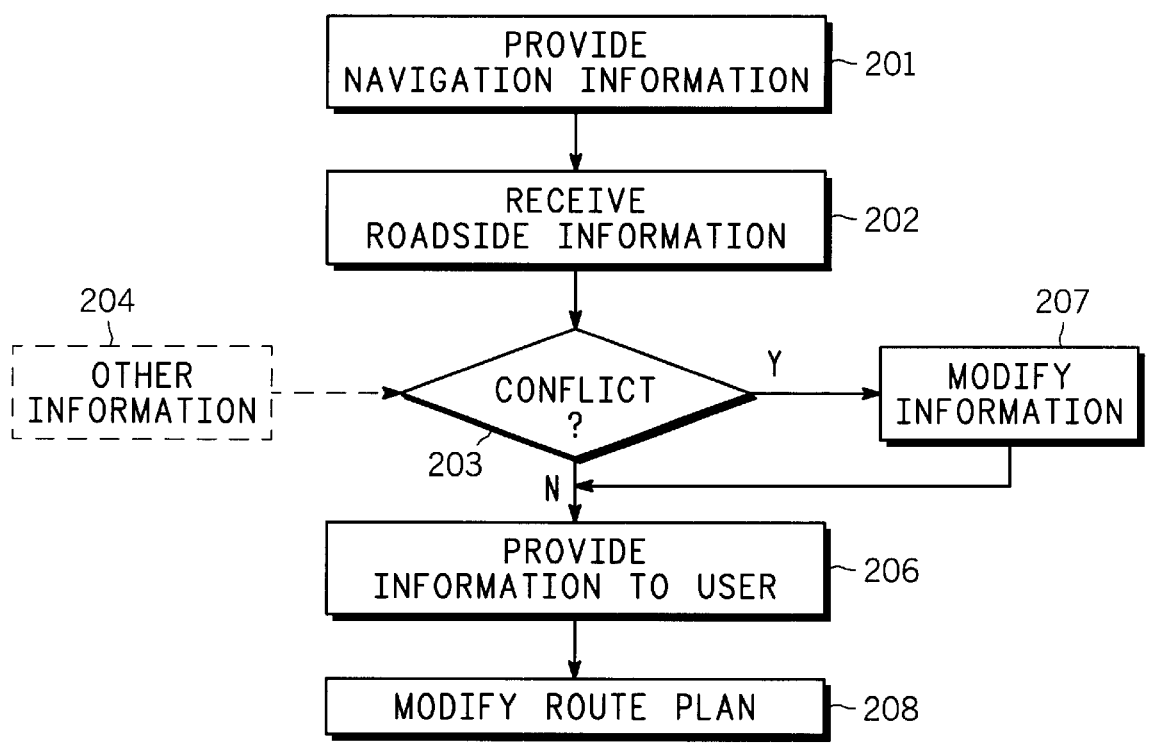
FIG. 2 comprises a flow-diagram depicting various embodiments in accordance with the invention.

Referring now to FIG. 2, the processing unit 109 is programmed to effect the following described actions in accordance with each embodiment as presented.

To begin, the navigation unit 101 provides 201 navigation information as appropriate to the present location of the vehicle and the intended destination. As previously stated, this navigation information includes information that is at least partially based upon navigation information that is stored in the vehicle in accordance with well-understood prior art technique. It is also possible, however, to provide at least some of the navigation information through radio frequency transmissions 116 from a service 117 that provides such information. For example, the in-vehicle navigation information can include basic map information while the remote service 117 can provide recent updates regarding road construction and repair and so-forth. Also as noted above, such navigation information can be at least also partially based upon vehicle activity sensors 106 as installed in the terrestrial vehicle if so desired. The navigation information as provided 201 will often comprise, for example, at least one navigation instruction that corresponds to directing the terrestrial vehicle to a predetermined destination. Typically, in the course of moving the terrestrial vehicle to a given predetermined destination, a plurality of such navigation instructions will be sequentially provided to facilitate sequential navigation actions in accordance with an overall journey plan.

As noted above, the roadside communications unit 107 will also be receiving 202 roadside information from time to time. In a preferred embodiment, such radio frequency transmissions will be compliant with a digital short-range communications roadside information service. Typically, such roadside information will constitute information regarding some aspect of the roadway and can include both public safety information (such as road hazard warnings) as well as commercial content (such as proximity of service stations and the like). Pursuant to one embodiment, however, such transmissions can also include an additional predetermined message that can signal, for example, a high priority for at least a portion of the received information (which high priority can be indicated for either a part or all of a concurrently received item of information or a subsequently received radio frequency transmission). For example, a road construction blockade that is being used to narrow a two-lane road down to a one-lane road can be equipped with a DSRC transmission beacon that includes with its lane closure alert message a supplementary indication that provides a high priority indication to the lane closure message itself. Such a priority indicator can be utilized as taught below.

Upon receiving both navigation information and roadside information as described above, the processing unit 109 can then determine 203 whether a conflict exists between the information so provided. In one embodiment, this determination 203 occurs within the processing unit 109 as installed in the terrestrial vehicle. In another embodiment, and using for example a remote service 117, at least part of the detection 203 can occur at a location remote from the terrestrial vehicle by using the remote service 117. The latter embodiment may be desirable when, for example, considerable processing capability is required and is not otherwise available to the processing unit 109, or when additional information not available to the processing unit 109 may be necessary or desired to reliably detect a conflict.

Pursuant to one embodiment, the conflict detection 203 can contrast received 202 roadside information that include warnings or instructions with the navigation instructions as provided 201 by the navigation unit 101. For example, when the navigation unit 101 directs that the vehicle should proceed west on a given street and received roadside information indicates that the street in question has been temporarily closed due to an accident, the navigation information instructions are inconsistent (and inappropriate) given the roadside information and a conflict can therefore be detected 203.

In one embodiment, detecting 203 a conflict can utilize information 204 other than navigation information and roadside information as provided above. For example, such other information 204 can include, depending upon the application, at least one journey goal for at least one occupant (which journey goal information may have been extracted from an itinerary as provided for the occupant and/or as otherwise entered by the occupant or retrieved through a wireless transaction using, for example, a personal digital assistant having wireless capability such as Bluetooth or DSRC-compatible transceiver capability), or a plurality of journey goals for one or more occupants of the terrestrial vehicle, or information from a previously stored profile for one or more users of the vehicle (which profile may include, for example, an intended or likely destination for the user as ascertained by past behavior for the profiled occupant), and/or historical information as reflected in past received DSRC roadside information service transmissions. These are only a few examples of other information 204 that can be utilized, if desired, to facilitate detection 203 of a conflict between navigation information and roadside information as received by the processing unit 109. The other information 204 can also include, if desired, past or presently received information from other terrestrial vehicles using, for example, DSRC compliant radio transmissions. For example, a vehicle traveling in the opposite direction can provide radio transmissions that are received by the radio communications unit 107 of the vehicle and that provide current information regarding road conditions, weather, and/or other hazards, opportunities, or issues regarding the roadway ahead of the receiving vehicle.

In one embodiment, the detection 203 may be limited to present and confirmed conflicts between navigation information and roadside information. If desired, however, detection 203 can also be broadened to include detection of potential or likely future information conflicts between navigation information and received information.

When no conflict is detected 203, the navigation information and roadside information can be provided 206 to the user in ordinary course. When, however, a conflict is detected 203, the processing unit 109 will effect modification 207 of at least one of the items of information.

Such modification 207 occurs automatically and without specific instructions from an occupant of the vehicle to so modify the information. Such modification can, for example, include automatic deletion of at least part of either a navigation instruction and/or roadside information. In the alternative, or as appropriate, modification 207 can include automatic deletion of an entire navigation instruction or roadside information message. In another embodiment, and as appropriate or desired, modification 207 can include merging navigation information with roadside information and/or combining one or both with other information 204 to provide resultant information that can then be provided 206 to a user. Again, such other information 204 may be provided locally at the vehicle or remotely from, for example, a remote service 117.

One reason for modifying 207 the information prior to providing it to the user is to avoid providing conflicting information that has a potential to distract a user from his or her driving responsibilities. Another reason for modifying the information is to attempt to provide information that will most reliably meet the journey goals of the user. As regards the latter, conflicts should typically be resolved in favor of modifying instructions such that the journey goals are met while simultaneously assuring safety and convenience. A hierarchy of decisions can be created and utilized as appropriate for a given user, vehicle, journey context, and any other relevant criteria to effect information modification upon detecting a conflict.

One possible outcome, if desired, to detecting 203 a conflict is to alter not only the specific information about to be provided to the user but to also modify 208 the route plan as previously calculated or established for this particular journey. That modified route plan may then result in subsequent navigation information instructions that can be viewed as modified with respect to navigation instructions that would have been provided but for the modification of the route plan.

Figure 3:
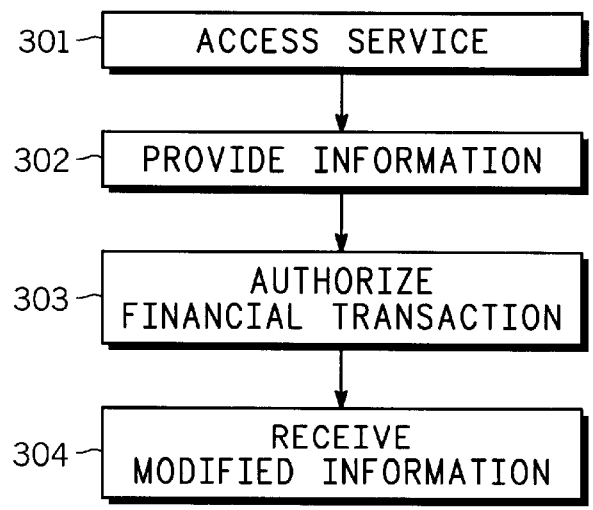
FIG. 3 comprises a detailed flow-diagram of additional embodiments configured in accordance with the invention.

As mentioned earlier, a remote service 117 may be useful in some applications to provide either conflict detection 203 or information modification 207 services. As regards the latter, and with reference to FIG. 3, to effect modification of information 207 the processing unit 109 may access 301 the remote service 117 (through, for example, a two-way unit 114 that is compatible with the radio transmissions 116 supported by the service 117) and provide 302 such information as the processing unit 109 presently has regarding the information causing the conflict. If desired, the service 117 can constitute a fee-per-transaction service such that a financial transaction is authorized 303 by the processing unit 109 in order to conclude the process. The remote service 117 can then modify the information (perhaps as better informed or more quickly effected by access to greater resources than as are otherwise available to the processing unit 109) and that modified information is transmitted to and received 304 by the processing unit 109, thereby making the modified information available to provide 206 to the user.

Figure 4:
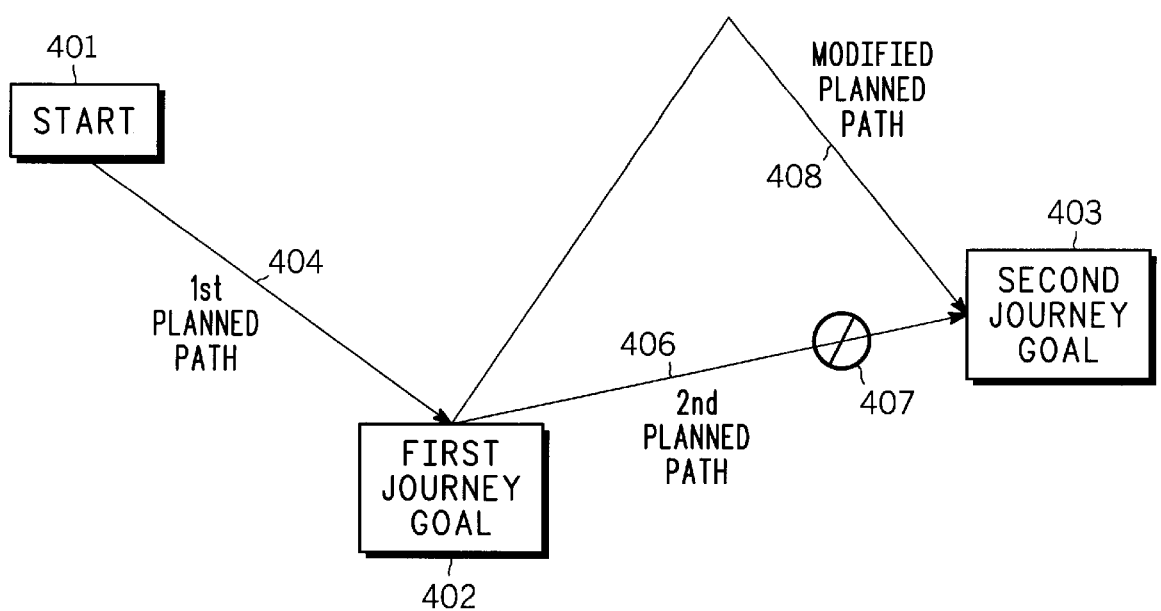
FIG. 4 comprises a top-plan block diagram depiction of an illustrative example in accordance with various embodiments of the invention.

Referring now to FIG. 4, a simple example will be presented. From a starting point 401, the processing unit 109 in a vehicle becomes apprised of a first and second journey goal 402 and 403 for an upcoming journey (for example, a driver may be driving a child to school (the first journey goal 402) and then driving to their place of employment (the second journey goal 403)). The navigation unit 101 directs the user via a first planned path 404 to the first journey goal 402 without any conflicts arising between instructions from the navigation unit 101 and information regarding the roadside as received from the roadside information service.

For purposes of this example, however, a second planned path 406, which the navigation unit 101 has plotted to guide the vehicle from the first journey goal 402 to the second journey goal 403, has been closed 407 due to an accident. The accident, of course, constitutes a real-time near-term incident and obstacle that constitutes information not likely to have been previously available to the navigation unit 101. Emergency vehicles at the site of the accident 407, however, equipped with DSRC transmitters and global positioning system location information, transmit the location of the accident and the fact that lane closures and/or a hazardous condition exists at that location.

The navigation unit 101, being without information regarding the accident, continues to provide instructions in accordance with the second planned path 406. Upon receiving these instructions, the processing unit 109 detects 203 a conflict between the second planned path 406 and the location of the accident 407. In this particular example, the processing unit 109 modifies the information to be provided to the user by effecting a modified planned path 408 as provided, for example, by a remote service 117. As a result, the user is safely directed to the second journey goal 403 without being subjected to conflicting information (for example, the user avoids being provided instructions directing the user along the second planned path and information informing the user that the second planned path 406 is closed due to an accident).

Whether navigation and journey related information systems are integrated or embodied as discrete functional elements, conflicts are going to arise between differing information outlets. In the absence of this invention, the vehicle user will receive conflicting information. Such conflicting information can lead, at a minimum, to confusion and distraction, and at worst can occasion dangerous circumstances in and of themselves. By provision by one or more of the embodiments taught above, the applicants' teachings are effective to minimize or alleviate the presentation of conflicting information and, in an optimum embodiment, offers the opportunity to not only avoid presenting conflicting information but increase the likelihood that a most appropriate course of action is facilitated.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

We claim:

1. A method for modifying vehicular navigation information comprising:
   in a terrestrial vehicle, providing navigation information that is at least partially based upon previously stored navigation information;
   in the terrestrial vehicle, receiving a radio frequency transmission that is compliant with a roadside information service to provide received information;
   detecting an information conflict between information content of the navigation information and information content of the received information;
   in response to detecting the information conflict automatically at least partially modifying at least one of the navigation information and the received information to provide resultant information;
   providing information at least partially based upon the resultant information to a user.

2. The method of claim 1 wherein providing navigation information that is at least partially based upon previously stored navigation information includes providing navigation information that is at least partially based upon navigation information that is stored in the terrestrial vehicle.

3. The method of claim 1 wherein providing navigation information that is at least partially based upon previously stored navigation information includes providing navigation information that is at least partially based upon a radio frequency transmission that is not compliant with the roadside information service and that includes at least some of the previously stored navigation information.

4. The method of claim 1 wherein providing navigation information further includes providing navigation information that is at least partially based upon vehicle activity sensors in the terrestrial vehicle.

5. The method of claim 1 wherein receiving a radio frequency transmission that is compliant with a roadside information service includes receiving a radio frequency transmission that is compliant with a digital short range communications roadside information service.

6. The method of claim 1 wherein detecting an information conflict between the navigation information and the received information includes detecting the information conflict at a location remote from the terrestrial vehicle.

7. The method of claim 1 wherein detecting an information conflict between the navigation information and the received information includes detecting the information conflict at the terrestrial vehicle.

8. The method of claim 1 wherein detecting an information conflict between the navigation information and the received information includes at least partially detecting the information conflict at a location remote from the terrestrial vehicle.

9. A method for modifying vehicular navigation information comprising:
   in a terrestrial vehicle, providing navigation information that is at least partially based upon previously stored navigation information;
   in the terrestrial vehicle, receiving a radio frequency transmission that is compliant with a roadside information service to provide received information;
   using other information to facilitate detecting an information conflict between the navigation information and the received information;
   in response to detecting the information conflict automatically at least partially modifying at least one of the navigation information and the received information to provide resultant information;

providing information at least partially based upon the resultant information to a user.

10. The method of claim 9 wherein using other information to facilitate detecting an information conflict between the navigation information and the received information includes using information regarding at least one journey goal for at least one occupant of the terrestrial vehicle to facilitate detecting an information conflict between the navigation information and the received information.

11. The method of claim 10 wherein using information regarding at least one journey goal includes using information from an itinerary for the at least one occupant.

12. The method of claim 10 and further comprising receiving a wireless transmission that includes information regarding the at least one journey goal.

13. The method of claim 10 wherein using information regarding at least one journey goal includes using information from a plurality of journey goals for at least one occupant of the terrestrial vehicle.

14. The method of claim 10 wherein using information regarding at least one journey goal for at least one occupant of the terrestrial vehicle includes using at least one journey goal for each of a plurality of occupants of the terrestrial vehicle.

15. The method of claim 9 wherein using other information includes using information from a profile for the user.

16. The method of claim 15 wherein using information from a profile for the user includes using information from a profile for the user regarding an intended destination for the user.

17. The method of claim 9 wherein using other information includes using information from a plurality of profiles wherein each profile corresponds to a different occupant of the terrestrial vehicle.

18. The method of claim 9 wherein using other information includes using historical information regarding past behavior for at least one occupant of the terrestrial vehicle.

19. The method of claim 9 wherein using other information includes using historical information regarding past received radio frequency transmission that were compliant with the roadside information service.

20. The method of claim 9 wherein using other information includes using at least some information provided by sensors in the terrestrial vehicle.

21. A method for modifying vehicular navigation information comprising:
in a terrestrial vehicle, providing navigation information that is at least partially based upon previously stored navigation information;
in the terrestrial vehicle, receiving a radio frequency transmission that is compliant with a roadside information service to provide received information;
detecting an information conflict between the navigation information and the received information by detecting a predetermined message in the received information;
in response to detecting the information conflict automatically at least partially modifying at least one of the navigation information and the received information to provide resultant information;
providing information at least partially based upon the resultant information to a user.

22. The method of claim 21 wherein detecting a predetermined message in the received information includes detecting a predetermined message which signals a high priority for at least a portion of the received information.

23. The method of claim 21 wherein detecting a predetermined message in the received information includes detecting a predetermined message which signals a high priority for at least one subsequently received radio frequency transmission that is compliant with the roadside information service.

24. A method for modifying vehicular navigation information comprising:
in a terrestrial vehicle, providing navigation information that is at least partially based upon previously stored navigation information;
in the terrestrial vehicle, receiving a radio frequency transmission that is compliant with a roadside information service to provide received information;
detecting an information conflict between the navigation information and the received information;
in response to detecting the information conflict automatically at least partially modifying at least one of the navigation information and the received information to provide resultant information by doing at least one of:
automatically deleting at least part of at least one of the navigation information and the received information to provide resultant information;
automatically deleting all of at least one of the navigation information and the received information to provide resultant information; and
automatically at least partially modifying at least one of the navigation information and the received information using other information to provide resultant information;
providing information at least partially based upon the resultant information to a user.

25. The method of claim 24 wherein the using other information includes using information provided by at least one in-vehicle sensor.

26. The method of claim 24 wherein the using other information includes using information provided by at least one occupant of the terrestrial vehicle.

27. The method of claim 24 wherein using other information includes using information provided from a remote site.

28. The method of claim 27 wherein using information provided from a remote site includes using information provided wirelessly from a remote site that is not compatible with the roadside information service.

29. The method of claim 27 wherein using information provided from a remote site includes authorizing a financial transaction.

30. A method for modifying vehicular navigation information comprising:
in a terrestrial vehicle, providing navigation information that is at least partially based upon previously stored navigation information;
in the terrestrial vehicle, receiving a radio frequency transmission that is compliant with a roadside information service to provide received information;
detecting an information conflict between the navigation information and the received information by detecting a potential future information conflict between the navigation information and the received information;
in response to detecting the information conflict automatically at least partially modifying at least one of the navigation information and the received information to provide resultant information;
providing information at least partially based upon the resultant information to a user.

31. The method of claim 30 wherein detecting a potential future information conflict between the navigation information and the received information includes detecting a potential future information conflict between the navigation information and the received information at least in part by use of other information received from at least one other terrestrial vehicle.

32. A method for modifying vehicular navigation information comprising:

in a terrestrial vehicle, providing navigation information that is at least partially based upon previously stored navigation information;

in the terrestrial vehicle, receiving a radio frequency transmission that is compliant with a roadside information service to provide received information;

detecting an information conflict between information content of the navigation information and information content of the received information;

in response to detecting the information conflict automatically at least partially modifying at least one of the navigation information and the received information to provide resultant information;

using the resultant information to at least partially modify a pre-existing route plan.

33. The method of claim 32 wherein providing navigation information that is at least partially based upon previously stored navigation information includes providing at least one navigation instruction that corresponds to directing the terrestrial vehicle to a predetermined destination.

34. The method of claim 32 wherein providing navigation information that is at least partially based upon previously stored navigation information includes providing a plurality of navigation instructions that correspond to directing the terrestrial vehicle to a plurality of predetermined sequentially reached destinations.

35. The method of claim 34 wherein detecting an information conflict between the navigation information and the received information includes detecting an information conflict between at least one of the navigation instructions and the received information.

36. An apparatus for use in a terrestrial vehicle comprising:

navigation means in the terrestrial vehicle for providing navigation information that is at least partially based upon previously stored navigation information;

radio means in the terrestrial vehicle for receiving radio frequency transmissions that are compliant with a roadside information service to provide received information;

detection means operably connected to the navigation means and the radio means for detecting an information conflict between information content of the navigation information and information content of the received information;

response means operably connected to the detection means, the navigation means, and the radio means and being responsive to detection of the information conflict for automatically at least partially modifying at least one of the navigation information and the received information to provide resultant information;

user interface means operably connected to the response means for providing at least part of the resultant information to a user in the terrestrial vehicle.

* * * * *